M. RIGELL.
Cultivator.
No. 29,618.  Patented Aug. 14, 1860.
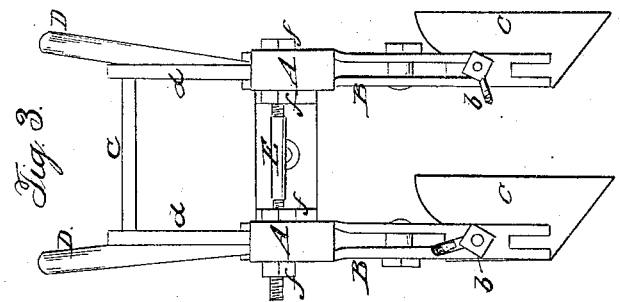
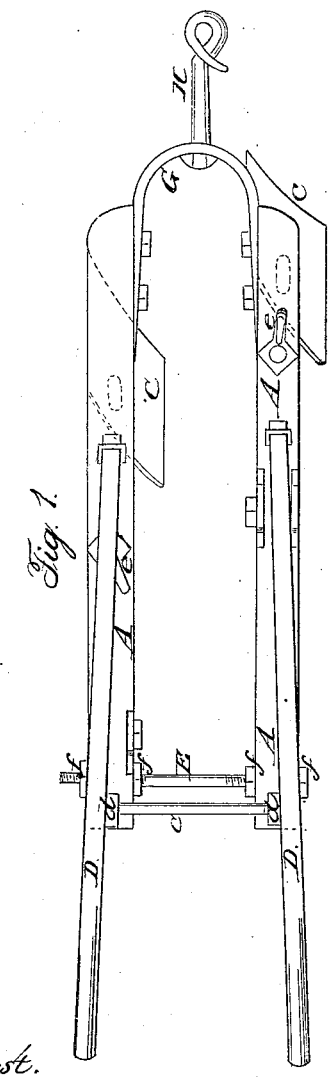
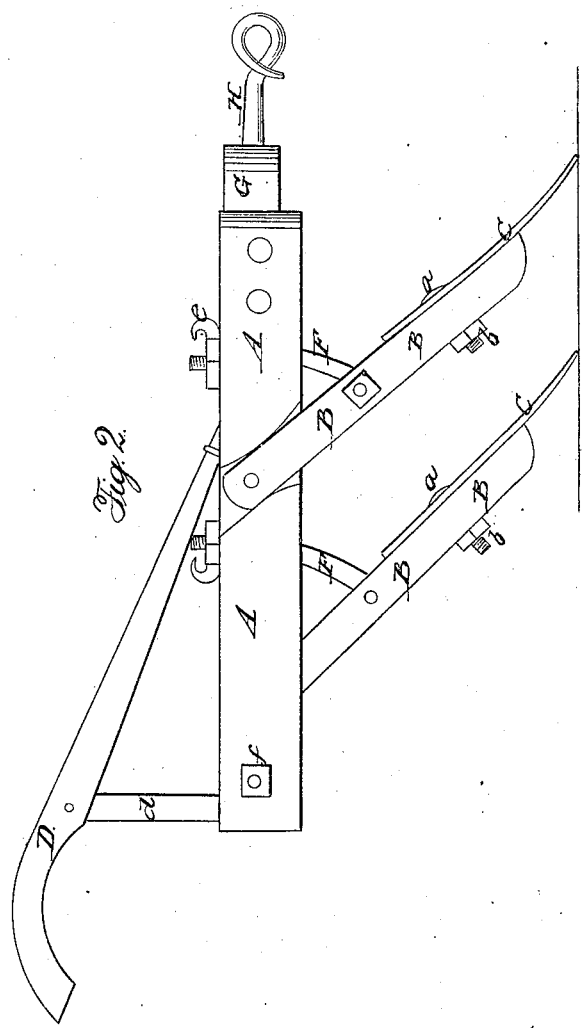
Attest.
W. Yorke Adee
A. Curdicombe
Inventor.
Mark Rigell
by his Atty
Thos. H. Dodge

UNITED STATES PATENT OFFICE.

MARK RIGELL, OF DAWSON, GEORGIA.

IMPROVEMENT IN CULTIVATORS.

Specification forming part of Letters Patent No. 29,618, dated August 14, 1860.

*To all whom it may concern:*

Be it known that I, MARK RIGELL, of Dawson, in the county of Terrell, in the State of Georgia, have invented a certain new and useful Improvement in Double Cultivators; and I do hereby declare that the following is a clear, full, and exact description thereof, reference being had to the accompanying drawings, forming a part of this specification, in which—

Figure 1 represents a plan or top view, Fig. 2 represents a side view, and Fig. 3 represents a rear view, of my improved machine.

A A represent the main draft-beams, and B B the adjustable stocks to which the shares C C are attached by bolts *a* and nuts *b*. The stocks B B are pivoted or hinged to the beams A, so that by means of rods F and nuts *e* they can be set at different angles with the beams A.

To the top of each beam A is attached a handle, D, the rear ends of which are sustained by standards *d d*, while they are connected by a cross-piece, *c*. The front ends of the beams A A are connected by a spring-shackle, G, through the center of which passes the draw-hook H, all as fully shown in the drawings.

The rear ends of the beams A A are connected by an adjusting-bar, E, with a double set of nuts, *f f*.

The advantage of my invention consists in the fact that no part of the machine has to be detached in order to set the shares C C near to or farther apart. The only thing necessary is to adjust the nuts *f f* on the bar E, for the spring-shackle G will always permit of the rear ends of the beams A A to conform to the desired adjustment.

The connection *c* can be made adjustable, if desired; but the standards *d d* will generally spring enough to render such a construction unnecessary.

The shares are set out of line, as shown in the drawings.

Another great advantage resulting from my mode of constructing the cultivator is due to the fact that the machine can be used on rough ground without danger of breaking the machine or of the shares, since, if the share-points catch against a root or stump, the spring-shackle G yields so as to avoid the sudden strain upon the shares C C and stocks B B, which would otherwise result.

It will thus be seen that shackle G performs the office of a self-adjusting connection to the beams A A, that of a draft-piece to the machine, and also that of a safety-draft spring to prevent sudden strains on the machine.

By my machine two rows can be plowed out at the same time—that is, the stocks B B may run on opposite sides of a row of young plants, or they may be so adjusted as to run between the same rows.

Having described my improved double cultivator, what I claim, and desire to secure by Letters Patent, is—

The combination of the spring-shackle G and adjusting-bar E with the beams A A and stocks B B, arranged and operating in relation to each other, as and for the purposes set forth.

In witness whereof I have hereunto signed my name.

MARK RIGELL.

Witnesses:
J. L. WESTON,
JAMES WILSON.